United States Patent
Brown et al.

(10) Patent No.: US 7,851,744 B2
(45) Date of Patent: Dec. 14, 2010

(54) MASS SPECTROMETER

(75) Inventors: Jeffery Mark Brown, Cheshire (GB); Daniel James Kenny, Cheshire (GB)

(73) Assignee: Micromass UK LImited, Manchester (GB)

( * ) Notice: Subject to any disclaimer, the term of this patent is extended or adjusted under 35 U.S.C. 154(b) by 411 days.

(21) Appl. No.: 11/722,663

(22) PCT Filed: Dec. 23, 2005

(86) PCT No.: PCT/GB2005/005054
§ 371 (c)(1),
(2), (4) Date: Mar. 4, 2008

(87) PCT Pub. No.: WO2006/067495
PCT Pub. Date: Jun. 29, 2006

(65) Prior Publication Data
US 2009/0039245 A1   Feb. 12, 2009

Related U.S. Application Data

(60) Provisional application No. 60/641,959, filed on Jan. 7, 2005.

(30) Foreign Application Priority Data

Dec. 23, 2004   (GB) ................... 0428185.3

(51) Int. Cl.
*B01D 59/44* (2006.01)
*H01J 49/00* (2006.01)
(52) U.S. Cl. .............. 250/284; 250/281; 250/282; 250/283; 250/286; 250/287; 250/288; 250/292
(58) Field of Classification Search ......... 250/281–284, 250/286–288, 292
See application file for complete search history.

(56) References Cited

U.S. PATENT DOCUMENTS

| | | | |
|---|---|---|---|
| 3,347,129 A | 10/1967 | Lohninger | |
| 6,707,031 B1 * | 3/2004 | Weinberger et al. | 250/281 |
| 6,762,405 B1 * | 7/2004 | Zhao et al. | 250/288 |
| 7,129,483 B2 * | 10/2006 | Youngquist et al. | 250/288 |

FOREIGN PATENT DOCUMENTS

| | | |
|---|---|---|
| EP | 1150156 | 10/2001 |
| WO | 00/70647 | 11/2000 |

OTHER PUBLICATIONS

Boyd, J. G. Vi, et al: "Fast-response Variable Focusing Micromirror Array Lens"; Proceeding of the SPIE, SPIE, Bellingham, VA, US, vol. 5055, 2003, pp. 278-286, XP-002990703, ISSN: 0277-786X.
"Manual Beam Expander"; Jun. 2001, Cascade Laser Corp, Newberg, OR, USA, XP002424442, Retrieved from the Internet URL:HTTP://WWW.CASCADELASER.COM/PDF%20FILES/MANUAL_BEAM_EXPANDER.PDF.

(Continued)

*Primary Examiner*—Jack I Berman
*Assistant Examiner*—Meenakshi S Sahu
(74) *Attorney, Agent, or Firm*—Jamie H. Rose (57) ABSTRACT

A Matrix Assisted Laser Desorption Ionization ion source or ion imaging device is disclosed comprising a laser (1) and a zoom lens (3, 4, 5). The zoom lens (3, 4, 5) is arranged to be able to vary the magnification of a laser beam which is directed onto a target region, sample surface or target plate (13) of the ion source or ion imaging device.

8 Claims, 3 Drawing Sheets

OTHER PUBLICATIONS

Sidney, F. Ray: "Applied Photographic Optics, Imaging System for Photography Film and Video"; 1988, Focal Press, Great Britain, XP002424165, p. 173-p. 177.

Adisorn Tuantranont et al: "Segmented Silicon-Micromachined Microelectromechanical Deformaable Mirrors for Adaptive Optics"; IEEE Journal of Selected Topics in Quantum Piscataway, NJ, US, vol. 8, No. 1, Jan. 2002, XP011062035, ISSN: 1077-260X.

* cited by examiner

MASS SPECTROMETER

CROSS REFERENCE TO RELATED APPLICATIONS

This application is the National Stage of International Application No. PCT/GB2005/05054, filed on Dec. 23, 2005, which claims priority to and benefit of U.S. Provisional Patent Application Ser. No. 60/641,959, filed on Jan. 7, 2005, and priority to and benefit of United Kingdom Patent Application No. 0428185, filed Dec. 23, 2004. The entire contents of these applications are incorporated herein by reference.

The present invention relates to apparatus for controlling the size of a laser beam which is targeted, in use, onto a target region of an ion source and a method of controlling the size of a laser beam which is targeted onto a target region of an ion source. The preferred embodiment relates to an imaging device for an ion source and a method of generating ions. The preferred embodiment further relates to an imaging device for controlling the spot size of a laser beam which is targeted onto a target region of a MALDI ion source.

Matrix Assisted Laser Desorption Ionisation ("MALDI") ion imaging mass spectrometry is a technology that generates molecular profiles and two-dimensional ion density maps from mass spectra acquired by mass analysing a sample at different points along or across the sample surface. For biological samples, peptide and protein signals can be taken directly from the surface of thin tissue sections which allows specific information to be obtained such as the relative abundance and spatial distribution of biological analytes. An important aspect of this approach is that a correlation can be maintained between the specific ion images and histological features observed by optical microscopy or other imaging techniques. With this method very different sample targets such as thin tissue slices, single cells, bioactive surfaces containing immobilized proteins, micro-deposited HPLC fractions or other MALDI sample preparations, for example, may be investigated. The spatial resolution of the known ion imaging approach is limited by the diameter of the laser beam which impinges upon the target plate or sample surface.

Conventional mass spectrometers comprising a MALDI ion source and a Time of Flight mass analyser are not suitable for ion imaging applications since the laser beam typically has a spot size which is 100-300 µm in diameter. Such a relatively large diameter beam is incompatible with high resolution ion imaging applications.

A known method of generating ion images from samples using MALDI is an ion microprobe as disclosed in Spengler, J. Am. Soc. Mass Spectrom. 2002, 13, 735-748. An ion microprobe has a laser spot which is focused to a spot diameter which is compatible with the required lateral resolution. The sample target is then moved beneath the laser spot in a known raster pattern. The ions desorbed are then analysed by a mass spectrometer and for each raster point (or pixel) a mass spectrum is generated and stored together with the spatial coordinates. This allows a 2D ion image for any mass to charge ratio to be created.

The ion microprobe may use a 0.5 µm laser spot by using a compound objective lens having a high numerical aperture. Visible light from the sample can also be imaged using an integrated confocal microscope using the same objective lens. The ion microprobe enables an optical image to be compared directly with an ion image obtained from the sample.

Another known instrument comprises a mass microscope as disclosed by Heeren et. al, Anal. Chem. 2004, 76, 5339-5344. A mass microscope differs from an ion microprobe in that the laser spot may be significantly larger as it does not limit the optical resolution. In a mass microscope the sample target acts as an ion optical object that is focused onto an ion optical image plane where ions are detected by an array ion detector. The spatial resolution for the mass microscope is reported to be about 4 µm.

A mass microscope requires a timed ion gate in order to allow only ions having mass to charge ratios within a very small range to reach the ion detector. The array ion detectors used are limited in data throughput and are incapable of recording full mass spectra. This is a significant problem and generally the preferred method of ion imaging is to use an ion microprobe rather than a mass microscope.

The mean laser fluence for a laser spot defined as the total energy incident per unit area per laser pulse is an important experimental parameter in MALDI applications. For any particular class of analyte and matrix, the laser fluence values providing optimised ion generation typically only span about a factor two beyond that of the threshold fluence which is defined as the onset of ion generation. If the laser fluence is too high then the analyte ions will simply fragment and the sensitivity will be correspondingly reduced.

Experimental results presented by Hillenkamp and Dreisewerd show that the laser fluence threshold needs to be increased if a smaller laser spot is used and this reduces sensitivity.

The homogeneity of laser fluence within the laser spot is another important experimental parameter in obtaining high quality MALDI data. Ideally, the laser fluence across a spot should be as uniform as possible i.e. the laser fluence should ideally have a flat-topped profile. Local variations in fluence within the spot can result in lower ionisation efficiency and increase the occurrence of fragmentation. Inhomogeneous laser fluence within the spot is therefore undesirable.

An ion microprobe includes complex laser optics which are specifically optimised for ion imaging at high lateral resolution (small spot sizes). If the image were defocused then the spot size would increase but this would be highly undesirable since the fluence of the laser spot would become substantially less homogeneous.

It is therefore desired to provide an improved imaging device for an ion source.

According to an aspect of the present invention there is provided apparatus for controlling the size of a laser beam which is targeted, in use, onto a target region, sample surface or target plate arranged within an ion source or ion imaging device of a mass spectrometer, the apparatus comprising:

one or more zoom lenses.

The one or more zoom lenses comprises a first lens and means arranged and adapted to alter or vary the axial position of the first lens. The one or more zoom lenses preferably further comprises a second lens and means arranged and adapted to alter or vary the axial position of the second lens. The one or more zoom lenses preferably comprises a third lens and means arranged and adapted to alter or vary the axial position of the third lens.

The one or more zoom lenses are preferably arranged to expand and/or contract a laser beam. The one or more zoom lenses are preferably arranged to increase and/or decrease the beam divergence of a laser beam. The one or more zoom lenses preferably comprise a variable magnification zoom lens or beam expander.

The image position of a laser spot preferably remains substantially invariant as the magnification is altered or changed.

According to another aspect of the present invention there is provided apparatus for controlling the size of a laser beam which is targeted, in use, onto a target region, sample surface or target plate arranged within an ion source or ion imaging device of a mass spectrometer, the apparatus comprising:

at least one beam splitter for splitting one or more laser beams into a first laser beam and a second laser beam; and overlap means for at least partially or wholly overlapping or at least partially or wholly recombining the first and the second laser beams.

The first laser beam and/or the second laser beam preferably have a substantially constant, uniform or homogeneous fluence or irradiance profile.

The overlap means preferably comprises one or more mirrors. The overlap means preferably comprises at least one beam combiner arranged to at least partially or wholly overlap or recombine the first laser beam and the second laser beam.

The apparatus preferably further comprises means arranged and adapted to vary the degree of overlap or recombination of the first and second beams. The means arranged and adapted to vary the degree of overlap or recombination preferably comprises one or more mirrors which are arranged to be translated or moved.

The image position of a laser spot preferably remains substantially invariant as the degree of overlap or recombination is altered or changed.

According to another aspect of the present invention there is provided apparatus for controlling the size of a laser beam which is targeted, in use, onto a target region, sample surface or target plate arranged within an ion source or ion imaging device of a mass spectrometer, the apparatus comprising:

a programmable mirror array or a digital micro-mirror array.

The programmable mirror array or the digital micro-mirror array preferably comprises a plurality of individually controllable pixel or mirror elements.

The apparatus preferably further comprises means arranged and adapted to control the pixel or mirror elements in order to direct and/or focus laser light onto the target region, sample surface or target plate.

The image position of a laser spot preferably remains substantially invariant as the programmable mirror array or digital micro-mirror array is altered or changed.

The diameter or size of the laser beam which impinges, in use, upon the target region, sample surface or target plate is preferably selected from the group consisting of: (i) <1 μm; (ii) 1-5 μm; (iii) 5-10 μm; (iv) 10-15 μm; (v) 15-20 μm; (vi) 20-25 μm; (vii) 25-30 μm; (viii) 30-35 μm; (ix) 35-40 μm; (x) 40-45 μm; (xi) 45-50 μm; (xii) 50-55 μm; (xiii) 55-60 μm; (xiv) 60-65 μm; (xv) 65-70 μm; (xvi) 70-75 μm; (xvii) 75-80 μm; (xviii) 80-85 μm; (xix) 85-90 μm; (xx) 90-95 μm; (xxi) 95-100 μm; (xxii) 100-120 μm; (xxiii) 120-140 μm; (xxiv) 140-160 μm; (xxv) 160-180 μm; (xxvi) 180-200 μm; (xxvii) 200-250 μm; (xxviii) 250-300 μm; (xxix) 300-350 μm; (xxx) 350-400 μm; (xxxi) 400-450 μm; (xxxii) 450-500 μm; (xxxiii) 500-600 μm; (xxxiv) 600-700 μm; (xxxv) 700-800 μm; (xxxvi) 800-900 μm; (xxxvii) 900-1000 μm; and (xxxviii) >1000 μm.

The diameter or size of the laser beam is preferably continuously variable.

The laser beam which impinges, in use, upon the target region, sample surface or target plate preferably has a laser fluence or homogeneity which varies by ≦5%, ≦10%, ≦15%, ≦20%, ≦25%, ≦30%, ≦35%, ≦40%, ≦45%, ≦50%, ≦55%, ≦60%, ≦65%, ≦70%, ≦75%, ≦80%, ≦85%, ≦90%, ≦95% or ≦100% across at least 5%, 10%, 15%, 20%, 25%, 30%, 35%, 40%, 45%, 50%, 55%, 60%, 65%, 70%, 75%, 80%, 85%, 90%, 95% or 100% of the diameter, size or width of the laser beam.

The apparatus preferably further comprises one or more lasers. The one or more lasers preferably comprise a pulsed laser. The one or more lasers are preferably arranged to have a pulse width selected from the group consisting of: (i) <1 ns; (ii) 1-2 ns; (iii) 2-3 ns; (iv) 3-4 ns; (v) 4-5 ns; (vi) 5-6 ns; (vii) 6-7 ns; (viii) 7-8 ns; (ix) 8-9 ns; (x) 9-10 ns; (xi) 10-20 ns; (xii) 20-30 ns; (xiii) 30-40 ns; (xiv) 40-50 ns; (xv) 50-60 ns; (xvi) 60-70 ns; (xvii) 70-80 ns; (xviii) 80-90 ns; (xix) 90-100 ns; (xx) 100-200 ns; (xxi) 200-300 ns; (xxii) 300-400 ns; (xxiii) 400-500 ns; (xxiv) 500-1000 ns; and (xxv) >1 μs.

The one or more lasers preferably have a laser repetition rate selected from the group consisting of: (i) <1 Hz; (ii) 1-5 Hz; (iii) 5-10 Hz; (iv) 10-15 Hz; (v) 15-20 Hz; (vi) 20-25 Hz; (vii) 25-30 Hz; (viii) 30-35 Hz; (ix) 35-40 Hz; (x) 40-45 Hz; (xi) 45-50 Hz; (xii) 50-100 Hz; (xiii) 100-200 Hz; (xiv) 200-300 Hz; (xv) 300-400 Hz; (xvi) 400-500 Hz; (xvii) 500-1000 Hz; (xviii) 1-2 kHz; (xix) 2-3 kHz; (xx) 3-4 kHz; (xxi) 4-5 kHz; (xxii) 5-10 kHz; (xxiii) 10-15 kHz; (xxiv) 15-20 kHz; (xxv) 20-25 kHz; (xxvi) 25-30 kHz; (xxvii) 30-35 kHz; (xxviii) 35-40 kHz; (xxix) 40-45 kHz; (xxx) 45-50 kHz; and (xxxi) >50 kHz.

According to a less preferred embodiment the one or more lasers comprises a continuous laser.

The one or more lasers may comprise a gas laser, for example, a laser selected from the group consisting of: (i) a nitrogen laser which is arranged to emit laser radiation having a wavelength of 337 nm; and (ii) a $CO_2$ laser which is arranged to emit laser radiation having a wavelength of 10.6 μm.

The one or more lasers may comprise an Excimer laser, for example, a laser selected from the group consisting of: (i) an XeCl laser which is arranged to emit laser radiation having a wavelength of 308 nm; (ii) a KrF laser which is arranged to emit laser radiation having a wavelength of 248 nm; (iii) an ArF laser which is arranged to emit laser radiation having a wavelength of 193 nm;

The one or more lasers may comprise a solid state laser, for example, a laser selected from the group consisting of: (i) a Nd:YAG laser; (ii) a frequency tripled Nd:YAG laser arranged to emit laser radiation having a wavelength of 355 nm; (iii) a frequency quadrupled Nd:YAG laser arranged to emit laser radiation having a wavelength of 266 nm; and (iv) an Er:YAG laser arranged to emit laser radiation having a wavelength of 2.94 μm.

The one or more lasers may comprise a semiconductor laser, for example, a laser selected from the group consisting of: (i) GaN; (ii) AlN; (iii) InN; (iv) ZnSe; (v) GaAs; (vi) GaP; (vii) Si; (viii) AlGaN; (ix) InGaN; (x) AlGaInN; (xi) GaAlN; (xii) AlInGaN; (xiii) AlGaAs; (xiv) InGaAsP; (xv) GaAsP; (xvi) GaAlAs; (xvii) ZnCdSe; (xviii) SiC; and (xix) InGaAs.

According to less preferred embodiments the one or more lasers may comprise a liquid or dye laser, for example an organic dye laser.

The one or more lasers are preferably arranged to emit laser radiation having a wavelength selected from the group consisting of: (i) <100 nm; (ii) 100-120 nm; (iii) 120-140 nm; (iv) 140-160 nm; (v) 160-180 nm; (vi) 180-200 nm; (vii) 200-220 nm; (viii) 220-240 nm; (ix) 240-260 nm; (x) 260-280 nm; (xi) 280-300 nm; (xii) 300-320 nm; (xiii) 320-340 nm; (xiv) 340-360 nm; (xv) 360-380 nm; (xvi) 380-400 nm; (xvii) 400-500 nm; (xviii) 500-600 nm; (xix) 600-700 nm; (xx) 700-800 nm; (xxi) 800-900 nm; (xxii) 900-1000 nm; (xxiii) 1000-1100 nm; (xxiv) 1100-1200 nm; (xxv) 1200-1300 nm; (xxvi) 1300-1400 nm; and (xxvii) 1400-1500 nm.

The one or more lasers may be arranged to emit laser radiation having a wavelength selected from the group consisting of: (i) 1.5-2.0 μm; (ii) 2.0-2.5 μm; (iii) 2.5-3.0 μm; (iv)

3.0-3.5 µm; (v) 3.5-4.0 µm; (vi) 4.0-4.5 µm; (vii) 4.5-5.0 µm; (viii) 5.0-5.5 µm; (ix) 5.5-6.0 µm; (x) 6.0-6.5 µm; (xi) 6.5-7.0 µm; (xii) 7.0-7.5 µm; (xiii) 7.5-8.0 µm; (ix) 8.0-8.5 µm; (x) 8.5-9.0 µm; (xi) 9.0-9.5 µm; (xii) 9.5-10.0 µm; (xiii) 10.0-10.5 µm; (xiv) 10.5-11.0 µm; and (xv) >11.0 µm.

According to an embodiment the one or more lasers may be arranged to emit laser radiation having a photon energy selected from the group consisting of: (i) <0.1 eV; (ii) 0.1-0.5 eV; (iii) 0.5-1.0 eV; (iv) 1.0-1.5 eV; (v) 1.5-2.0 eV; (vi) 2.0-2.5 eV; (vii) 2.5-3.0 eV; (viii) 3.0-3.5 eV; (ix) 3.5-4.0 eV; (x) 4.0-4.5 eV; (xi) 4.5-5.0 eV; (xii) 5.0-5.5 eV; (xiii) 5.5-6.0 eV; (xiv) 6.0-6.5 eV; (xv) 6.5-7.0 eV; (xvi) 7.0-7.5 eV; (xvii) 7.5-8.0 eV; (xviii) 8.0-8.5 eV; (xix) 8.5-9.0 eV; (xx) 9.0-9.5 eV; (xxi) 9.5-10.0 eV; (xxii) 10.0-10.5 eV; (xxiii) 10.5-11.0 eV; (xxiv) 11.0-11.5 eV; (xxv) 11.5-12.0 eV; (xxvi) 12.0-12.5 eV; (xxvii) 12.5-13.0 eV; (xxviii) 13.0-13.5 eV; (xxix) 13.5-14.0 eV; (xxx) 14.0-14.5 eV; (xxxi) 14.5-15.0 eV; (xxxii) 15.0-15.5 eV; (xxxiii) 15.5-16.0 eV; (xxxiv) 16.0-16.5 eV; (xxxv) 16.5-17.0 eV; (xxxvi) 17.0-17.5 eV; (xxxvii) 17.5-18.0 eV; (xxxviii) 18.0-18.5 eV; (xxxix) 18.5-19.0 eV; (xl) 19.0-19.5 eV; (xli) 19.5-20.0 eV; and (xlii) >20.0 eV.

The apparatus preferably further comprises an attenuator for adjusting or reducing the intensity of a laser beam.

The apparatus preferably further comprises a vacuum chamber and wherein the target region, sample surface or target plate is located within the vacuum chamber. The vacuum chamber preferably comprises a window through which a laser beam is transmitted in use.

The apparatus preferably further comprises one or more mirrors for directing a laser beam onto the target region, sample surface or target plate. The apparatus preferably further comprises a focusing lens for focusing a laser beam onto the target region, sample surface or target plate. The focusing lens preferably has a focal length selected from the group consisting of: (i) <5 mm; (ii) 5-10 mm; (iii) 10-15 mm; (iv) 15-20 mm; (v) 20-25 mm; (vi) 25-30 mm; (vii) 30-35 mm; (viii) 35-40 mm; (ix) 40-45 mm; (x) 45-50 mm; and (xi) >50 mm. The focusing lens preferably comprises an achromatic doublet or aspheric lens.

The target region, sample surface or target plate is preferably selected from the group consisting of: (i) a thin tissue slice; (ii) a single cell; (iii) a bioactive surface containing immobilized proteins; (iv) micro-deposited HPLC fractions; (v) a portion of an intact biological cell or a biological sample; (vi) an affinity capture substrate; (vii) an antibody capture substrate; (viii) one or more lysated cells or biological samples; (ix) a blood plasma deposit; and (x) a serum deposit. The thin tissue slice may have a thickness <100 µm, preferably <50 µm, further preferably 10-25 µm.

The target region, sample surface or target plate may comprise a 2D-gel or an electro-blot of a 2D-gel.

The target region, sample surface or target plate may comprise one or more solid matrix-analyte deposits. The one or more solid matrix-analyte deposits may be formed by a sample preparation method selected from the group consisting of: (i) dried-droplet; (ii) vacuum-drying; (iii) crushed-crystal; (iv) fast-evaporation; (v) overlaying; (vi) sandwiching; (vii) spin-coating; (viii) slow-crystallization; (ix) Electrospray; and (x) depositing sample upon a precoated target spot.

According to less preferred embodiments the target region, sample surface or target plate may comprise a liquid matrix or an insoluble sample.

According to an embodiment the target region, sample surface or target plate may comprise a solid support. The solid support may comprise porous silicon.

The apparatus preferably further comprises an extraction lens or ion-optical arrangement arranged downstream of the target region, sample surface or target plate, the extraction lens or ion-optical arrangement being arranged to accelerate, attract or extract ions away from the target region, sample surface or target plate.

According to the preferred embodiment the ion source comprises a Matrix Assisted Laser Desorption Ionisation ("MALDI") ion source.

According to another embodiment the ion source comprises a Laser Desorption Ionisation ("LDI") ion source or a Desorption Ionisation on Silicon ("DIOS") ion source.

The target region, sample surface or target plate is preferably maintained at a pressure selected from the group consisting of: i) $>10^{-7}$ mbar; (ii) $>10^{-6}$ mbar; (iii) $>10^{-5}$ mbar; (iv) $>10^{-4}$ mbar; (v) $>10^{-3}$ mbar; (vi) $>10^{-2}$ mbar; (vii) >0.1 mbar; (viii) >1 mbar; (ix) >10 mbar; (x) >100 mbar; and (xi) >1000 mbar.

The target region, sample surface or target plate is preferably maintained at a pressure selected from the group consisting of: (i) $<10^{-7}$ mbar; (ii) $<10^{-6}$ mbar; (iii) $<10^{-5}$ mbar; (iv) $<10^{-4}$ mbar; (v) $<10^{-3}$ mbar; (vi) <0.01 mbar; (vii) <0.1 mbar; (viii) <1 mbar; (ix) <10 mbar; (x) <100 mbar; and (xi) <1000 mbar.

The target region, sample surface or target plate is preferably maintained at a pressure selected from the group consisting of: (i) $10^{-7}$-$10^{-6}$ mbar; (ii) $10^{-6}$-$10^{-5}$ mbar; (iii) $10^{-5}$-$10^{-4}$ mbar; (iv) $10^{-4}$-$10^{-3}$ mbar; (v) $10^{-3}$-$10^{-2}$ mbar; (vi) $10^{-2}$-$10^{-1}$ mbar; (vii) 0.1-1 mbar; (viii) 1-10 mbar; (ix) 10-100 mbar; and (x) 100-1000 mbar.

In a mode of operation the apparatus is preferably arranged to target a laser beam onto a target region, sample surface or target plate of an ion source.

In a mode of operation the apparatus is preferably arranged to target a laser beam onto a target region, sample surface or target plate of an ion imaging device.

According to another aspect of the present invention there is provided a mass spectrometer comprising apparatus as described above.

The mass spectrometer preferably further comprises a first electric field region and a first field free region arranged downstream of the first electric field region.

The mass spectrometer preferably further comprises a second electric field region and a second field free region arranged downstream of the second electric field region.

The mass spectrometer preferably further comprises a collision, fragmentation or reaction device. The collision, fragmentation or reaction device is preferably arranged to fragment ions by Collisional Induced Dissociation ("CID").

According to a less preferred embodiment the collision, fragmentation or reaction device is selected from the group consisting of: (i) a Surface Induced Dissociation ("SID") fragmentation device; (ii) an Electron Transfer Dissociation fragmentation device; (iii) an Electron Capture Dissociation fragmentation device; (iv) an Electron Collision or Impact Dissociation fragmentation device; (v) a Photo Induced Dissociation ("PID") fragmentation device; (vi) a Laser Induced Dissociation fragmentation device; (vii) an infrared radiation induced dissociation device; (viii) an ultraviolet radiation induced dissociation device; (ix) a nozzle-skimmer interface fragmentation device; (x) an in-source fragmentation device; (xi) an ion-source Collision Induced Dissociation fragmentation device; (xii) a thermal or temperature source fragmentation device; (xiii) an electric field induced fragmentation device; (xiv) a magnetic field induced fragmentation device; (xv) an enzyme digestion or enzyme degradation fragmentation device; (xvi) an ion-ion reaction fragmentation device;

(xvii) an ion-molecule reaction fragmentation device; (xviii) an ion-atom reaction fragmentation device; (xix) an ion-metastable ion reaction fragmentation device; (xx) an ion-metastable molecule reaction fragmentation device; (xxi) an ion-metastable atom reaction fragmentation device; (xxii) an ion-ion reaction device for reacting ions to form adduct or product ions; (xxiii) an ion-molecule reaction device for reacting ions to form adduct or product ions; (xxiv) an ion-atom reaction device for reacting ions to form adduct or product ions; (xxv) an ion-metastable ion reaction device for reacting ions to form adduct or product ions; (xxvi) an ion-metastable molecule reaction device for reacting ions to form adduct or product ions; and (xxvii) an ion-metastable atom reaction device for reacting ions to form adduct or product ions.

A reaction device should be understood as comprising a device wherein ions, atoms or molecules are rearranged or reacted so as to form a new species of ion, atom or molecule. An X-Y reaction fragmentation device should be understood as meaning a device wherein X and Y combine to form a product which then fragments. This is different to a fragmentation device per se wherein ions may be caused to fragment without first forming a product. An X-Y reaction device should be understood as meaning a device wherein X and Y combine to form a product and wherein the product does not necessarily then fragment.

The mass spectrometer may comprise means for causing and/or allowing ions to fragment by Post Source Decay ("PSD").

The mass spectrometer preferably further comprises an electrostatic energy analyser and/or a mass filter and/or an ion gate for selecting specific parent or precursor ions. The mass filter preferably comprises a magnetic sector mass filter, an RF quadrupole mass filter, a Wien filter or an orthogonal acceleration Time of Flight mass filter.

The mass spectrometer preferably further comprises a mass analyser. The mass analyser may be selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic or orbitrap mass analyser; (x) a Fourier Transform electrostatic or orbitrap mass analyser; (xi) a Fourier Transform mass analyser; (xii) a Time of Flight mass analyser; (xiii) an axial acceleration Time of Flight mass analyser; (xiv) an orthogonal acceleration Time of Flight mass analyser; and (xv) a mass microscope stigmatic imaging Time of Flight mass analyser.

If the mass analyser comprises a mass microscope stigmatic imaging system then the fluence or irradiance of the laser spot is preferably constant or has a substantially flat topped profile.

According to another aspect of the present invention there is provided a method of controlling the size of a laser beam which is targeted onto a target region, sample surface or target plate arranged within an ion source or an ion imaging device of a mass spectrometer, the method comprising:

using one or more zoom lenses to control the size of a laser beam which is targeted onto a target region, sample surface or target plate arranged within an ion source or ion imaging device of a mass spectrometer.

According to another aspect of the present invention there is provided a method of controlling the size of a laser beam which is targeted onto a target region, sample surface or target plate arranged within an ion source or ion imaging device of a mass spectrometer, the method comprising:

splitting one or more lasers beam into a first laser beam and a second laser beam; and overlapping the first and the second laser beams.

According to another aspect of the present invention there is provided a method of controlling the size of a laser beam which is targeted onto a target region, sample surface or target plate arranged within an ion source or ion imaging device of a mass spectrometer, the method comprising:

using a programmable mirror array or a digital micro-mirror array to control the size of a laser beam which is targeted onto a target region, sample surface or target plate arranged within an ion source or ion imaging device of a mass spectrometer.

According to another aspect of the present invention there is provided a method of mass spectrometry comprising a method as discussed above.

According to the preferred embodiment an improved MALDI optical system and an improved method of focusing light in a MALDI ion source is provided.

The preferred embodiment preferably enables the laser spot diameter to be controlled whilst also ensuring that the laser fluence remains substantially uniform throughout or across the diameter of the spot. This is preferably achieved by utilising a variable magnification zoom lens or beam expander which preferably does not change the image position of the spot as the magnification is changed.

The preferred embodiment preferably enables a continuously variable spot size ranging from approximately 1 μm or the diffraction limit up to several hundred microns to be provided.

According to an embodiment the imaging device may be fitted to a conventional mass spectrometer comprising a MALDI ion source and a Time of Flight mass analyser. This enables the mass spectrometer to function both as an ion imaging mass spectrometer with high spatial resolution and also as a conventional mass spectrometer comprising MALDI ion source coupled to a Time of Flight mass analyser.

Various embodiments of the invention will now be described, by way of example only, and with reference to the accompanying drawings in which.

An imaging device for an ion source or ion imaging device according to a preferred embodiment of the present invention will now be described with reference to FIG. 1. The imaging device preferably comprises a laser 1 for delivering a source or beam of light 2. The laser may be connected or coupled to an optical fibre which is arranged to output a beam of light 2.

The imaging device preferably comprises a zoom lens 3,4,5 which is preferably provided downstream of the laser 1. The zoom lens preferably comprises three separate lenses 3,4,5. One, two or all three of the lenses 3,4,5 are preferably mounted on a motorised translation stage. The axial positions of one, two or all three of the individual lenses 3,4,5 may preferably be altered or varied by means of motorised actuators. According to the preferred embodiment the axial position of one or more of the lenses 3,4,5 can be varied or altered which enables the laser beam to be expanded or contracted thereby decreasing or increasing the beam divergence.

According to the preferred embodiment the zoom lens 3,4,5 preferably expands the laser beam. A portion of the expanded laser beam is then preferably passed through an attenuator 6 which is arranged to adjust the intensity of the laser beam. The laser beam is then preferably arranged to pass through a vacuum window 9 into the housing of a vacuum chamber. The vacuum chamber window 9 is preferably mounted in a wall 8 of the vacuum chamber.

A mirror 10 is preferably arranged within the vacuum chamber and preferably directs or reflects the laser beam onto a final focusing lens 11. The final focusing lens 11 preferably has a relatively short focal length e.g. 15 mm. The final focusing lens 11 may according to an embodiment have a diameter of 12 mm. The final focusing lens 11 may preferably comprise either an achromat doublet or an aspheric lens. The final focusing lens 11 is preferably arranged to focus the laser beam down to a spot on or at a target region, sample surface or target plate 13. The intense pulsed laser beam which preferably impinges upon the target region, sample surface or target plate 13 preferably causes ions to be produced at the focal point 14 of the laser beam.

An ion source extraction lens 12 or other ion-optical device is preferably arranged in relatively close proximity to the target region, sample surface or target plate 13 and preferably assists in directing, attracting, accelerating or extracts ions which have been generated or produced at the target region, sample surface or target plate 13 away into the main housing of a mass spectrometer (not shown) which is preferably arranged downstream of the target region, sample surface or target plate 13.

The mass spectrometer preferably comprises a Time of Flight mass analyser (not shown) and may comprise a Collision Induced Dissociation collision or fragmentation cell (not shown).

The preferred method of controlling the spot size of the laser beam which is targeted onto the target region, sample surface or target plate 14 will now be discussed in more detail.

An approximation of the spot size D of the laser beam on the target region, sample surface or target plate 14 can be calculated from the following equation:

$$D = \sqrt{(f \cdot \theta)^2 + \left[\frac{0.067 \cdot f}{(f/D1)^3}\right]^2 + [2.44\lambda \cdot (f/D1)]^2} \quad (1)$$

wherein a beam divergence or spot size term (f.θ), a spherical aberration term $(0.067.f/(f/Dl)^3)$ and a fundamental diffraction limited spot size term (2.44. λ.f/Dl) are assumed to be independent and are added in quadrature and wherein θ is the known divergence of the laser beam, f is focal length of the final focusing lens 11, λ is the wavelength of the laser beam and Dl is the diameter of the laser beam at the final focusing lens 11.

It is to be noted that the diffraction limited spot size term is relatively small for Gaussian laser beams. The spherical aberration term may be effectively eliminated using well designed aspheric lenses or achromat pairs. Accordingly, the dominant term in the above equation is the beam divergence or spot size term. Therefore, in order to generate a small spot size, the focal length f of the final focusing lens 11 should preferably be made as short as possible and the beam divergence θ should preferably be made as low as possible.

According to the preferred embodiment the spot size is preferably controlled or varied by changing the beam divergence θ of the laser beam. This is preferably accomplished by expanding or contracting the laser beam using the zoom lens assembly 3,4,5. If the laser beam is expanded then the beam divergence is reduced proportionally and hence the corresponding beam divergence or spot size term (f.θ) reduces.

According to the preferred embodiment the laser beam is preferably focused at the target region, sample surface or target plate 13 since a focused spot is preferably significantly more homogenous than an unfocused spot.

According to the preferred embodiment as the magnification of the zoom lens 3,4,5 is preferably varied the appropriate lenses within the zoom lens assembly 3,4,5 are preferably moved axially in a predefined function. This preferably ensures that the laser spot remains in focus at the target region, sample surface or target plate 13. For accuracy and convenience, the positional actuation of the lens elements 3,4,5 may be motorised and may be remotely controlled by, for example, a computer or other controller.

Figure 2:
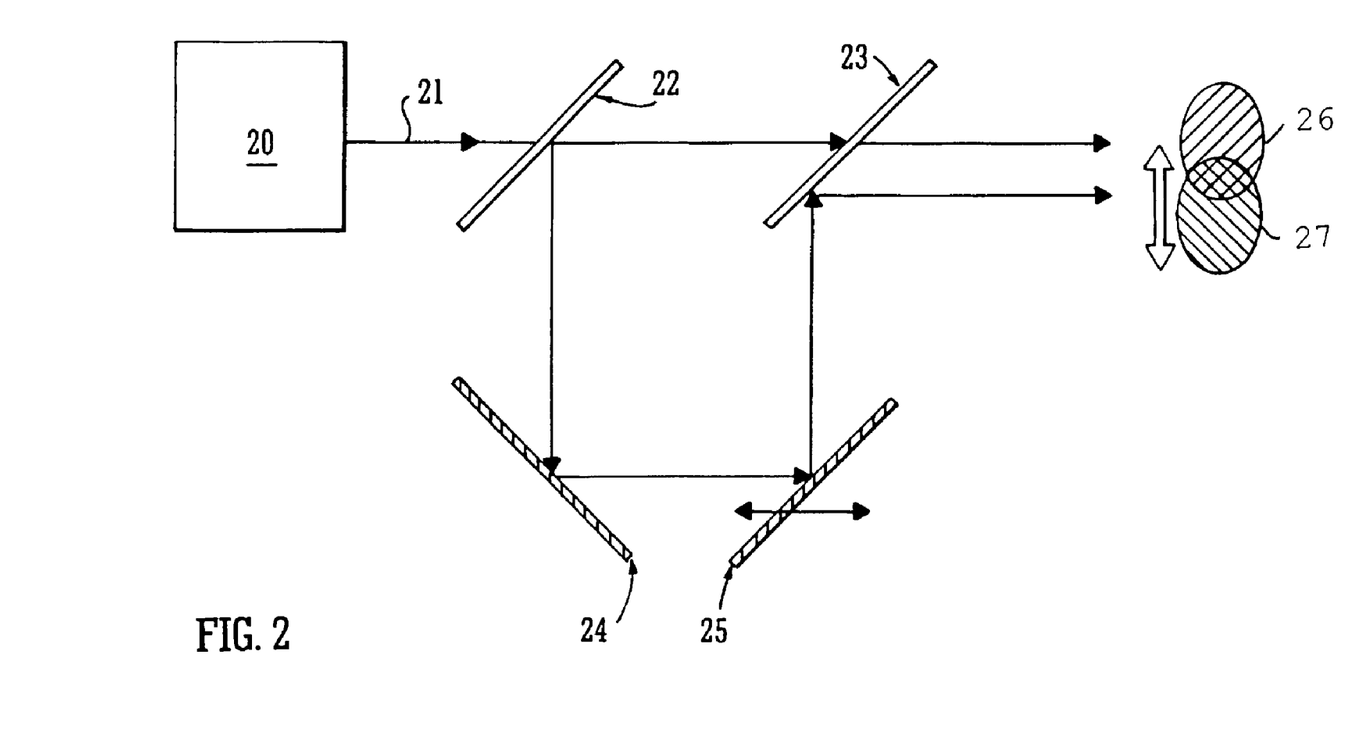
FIG. 2 shows an alternative embodiment of the present invention wherein a beam splitter is used to split a laser beam into two beams which are then partially overlapped or recombined.

An alternative embodiment of the present invention will now be illustrated with reference to FIG. 2. According to this alternative embodiment the laser spot diameter or size is preferably controlled by overlapping two circular spots 26,27 which each preferably have a substantially flat top fluence profile. According to this embodiment a laser 20 is provided which preferably provides or generates a laser beam 21 which preferably has a substantially flat top fluence profile. The laser beam 21 preferably passes through a beam splitter 22 which preferably splits the beam into two paths or two separate beam.

One portion of the laser beam preferably passes or continues onto a beam combiner 23 whilst the other portion of the laser beam preferably passes to a first mirror 24. The laser beam which passed to the first mirror 24 is preferably deflected or reflected by the first mirror 24 is then preferably deflected or reflected by a second mirror 25. The beam then preferably passes or continues onto the beam combiner 23. The two beams which arrive at or impinge upon the beam combiner 23 are preferably arranged such that they then at least partially overlap or recombine.

The overlap region is the region of greatest intensity and preferably forms the ionisation spot on the target region, sample surface or target plate of the ion source or ion imaging device. The degree of overlap or recombination of the two laser beams may preferably be adjusted by moving either the first mirror 24 and/or the second mirror 25.

Figure 1:
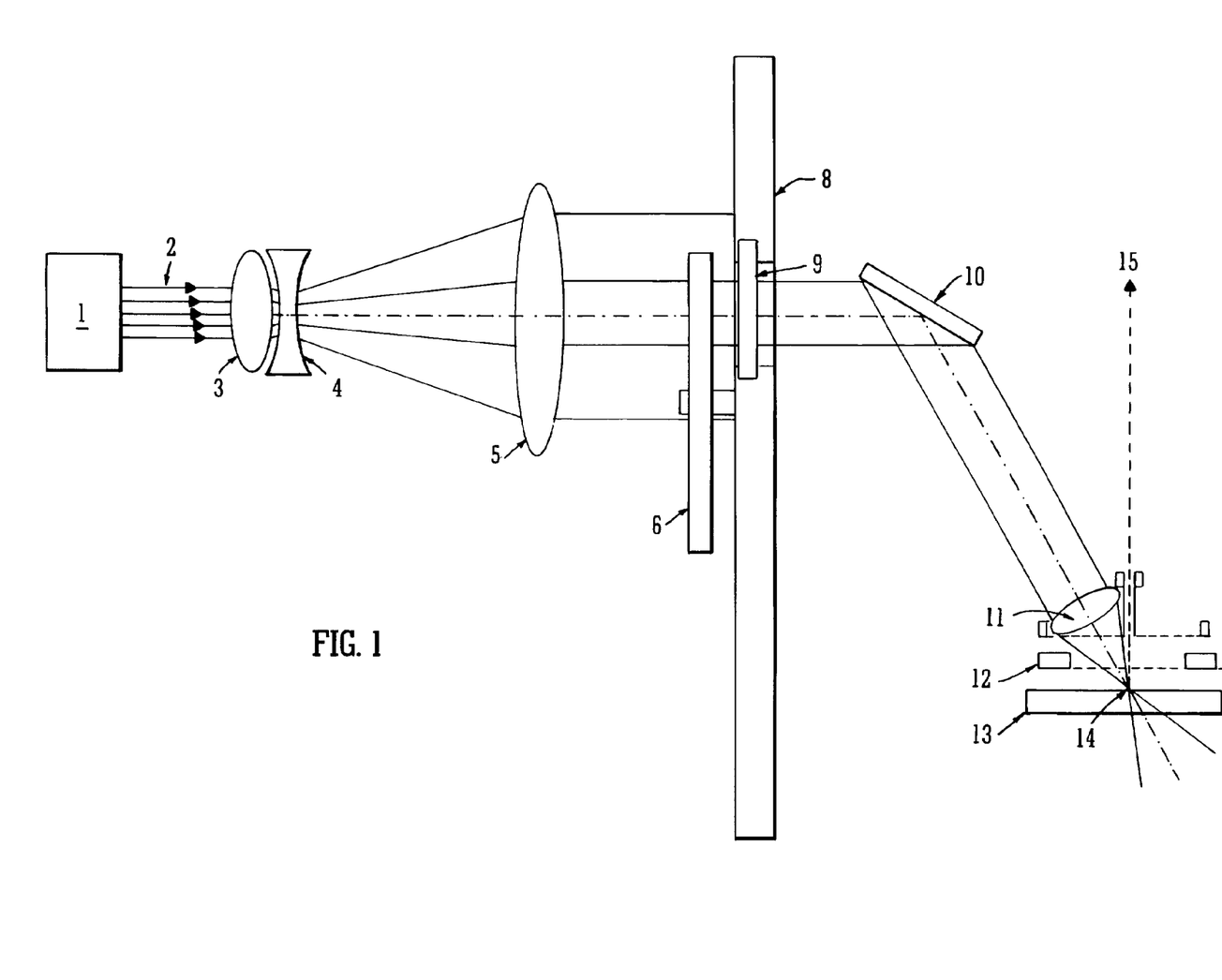
FIG. 1 shows a zoom lens for controlling the spot size of a laser beam in a MALDI ion source or ion imaging device according to a preferred embodiment of the present invention.

According to this alternative embodiment the diffraction limit discussed above in relation to the embodiment described and discussed with regard to FIG. 1 do not apply. It is therefore possible to provide laser beams having small spot sizes even when using laser radiation which may have a relatively long wavelength such as IR radiation.

Figure 3:
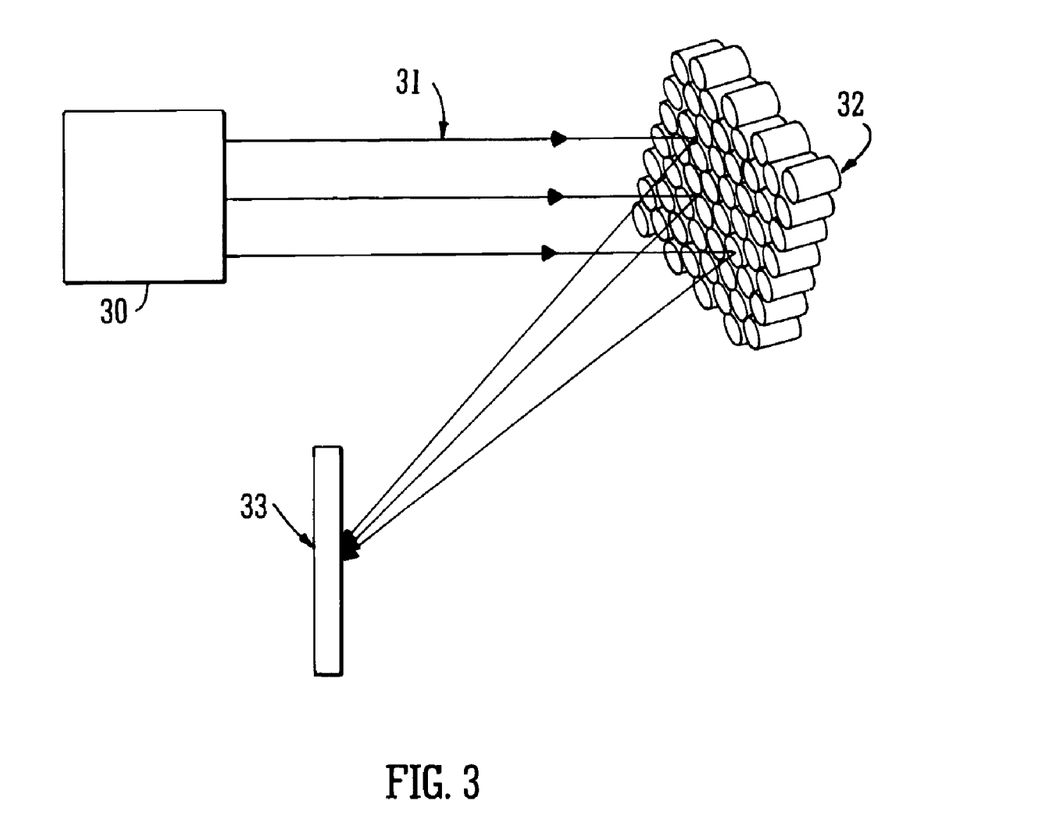
FIG. 3 shows a further embodiment of the present invention wherein a programmable mirror array or a digital micro-mirror array is used to focus a laser beam onto a target region or sample surface.

A further embodiment of the present invention will now be described with reference to FIG. 3. FIG. 3 shows an embodiment comprising a laser source 30 and a programmable mirror array (PMA) or a digital micro-mirror array 32 arranged downstream of the laser source 30.

A laser beam 31 is preferably emitted from the laser source 30 and is preferably arranged to impinge upon the programmable mirror array or the digital micro-mirror array 32. The programmable mirror array or the digital micro-mirror array 32 is preferably automatically controlled.

The programmable mirror array or the digital micro-mirror array 32 preferably comprises a plurality of individual mirrors, reflective elements or pixels. Each individual mirror, reflective element or pixel may preferably be controlled by a computer or other means. The individual mirrors, reflective elements or pixels may be arranged or configured in a mode of operation so as to direct and focus laser light onto the target region, sample surface or target plate 33 of an ion source or ion imaging device.

The focal point, beam angle and shape or profile of the laser spot may be controlled by the programmable mirror array or the digital micro-mirror array 32. The laser spot fluence or homogeneity is preferably maintained as the spot diameter is preferably varied.

Although the present invention has been described with reference to preferred embodiments, it will be understood by those skilled in the art that various changes in form and detail may be made without departing from the scope of the invention as set forth in the accompanying claims.

The invention claimed is:

1. A mass spectrometer comprising:
a laser;
an ion source or imaging device having a target region, sample surface or target plate arranged therein; and
apparatus for controlling the size of a laser beam which is targeted, in use, onto said target region, sample surface or target plate, said apparatus comprising:
at least one beam splitter for splitting one or more laser beams into a first laser beam and a second laser beam; and
overlap means for at least partially or wholly overlapping said first and said second laser beams.

2. A mass spectrometer as claimed in claim 1, wherein said first laser beam and/or said second laser beam have a substantially constant, uniform or homogeneous fluence or irradiance profile.

3. A mass spectrometer as claimed in claim 1, wherein said overlap means comprises at least one beam combiner arranged to at least partially or wholly overlap said first laser beam and said second laser beam.

4. A mass spectrometer as claimed in claim 1, further comprising means arranged and adapted to vary the degree of overlap of said first and second beams.

5. A mass spectrometer as claimed in claim 4, wherein said means arranged and adapted to vary the degree of overlap or recombination comprises one or more mirrors which are arranged to be translated or moved.

6. A mass spectrometer as claimed in claim 4, wherein the image position of a laser spot remains substantially invariant as the degree of overlap is altered or changed.

7. A method of controlling the spot size of a laser beam which is targeted onto a target region, sample surface or target plate arranged within an ion source or an ion imaging device of a mass spectrometer, said method comprising:
splitting one or more laser beams into a first laser beam and a second laser beam; and
overlapping said first and said second laser beams.

8. A method of mass spectrometry comprising a method as claimed in claim 7.

* * * * *